United States Patent [19]

Wilda et al.

[11] Patent Number: 5,125,275
[45] Date of Patent: Jun. 30, 1992

[54] PRESSURE SENSOR PACKAGE

[75] Inventors: Douglas W. Wilda, Ambler; Charles E. Lane, III, Meadowbrook, both of Pa.

[73] Assignee: Honeywell Inc., Minneapolis, Minn.

[21] Appl. No.: 717,582

[22] Filed: Jun. 19, 1991

[51] Int. Cl.[5] .......................... G01L 7/08; G01L 9/06
[52] U.S. Cl. ...................................... 73/756; 73/706; 73/721; 73/727; 338/4
[58] Field of Search .......... 73/756, 702, 706, 716–728, 73/754, DIG. 4; 338/4; 361/283; 29/621.1

[56] References Cited

U.S. PATENT DOCUMENTS

| | | | |
|---|---|---|---|
| 4,295,117 | 10/1981 | Lake et al. | 73/727 |
| 4,592,229 | 6/1986 | Butefisch et al. | 73/727 |

Primary Examiner—Donald O. Woodiel
Attorney, Agent, or Firm—A. A. Sapelli; D. Lenkszus; W. Udseth

[57] ABSTRACT

A pressure sensor package, having a dual-in-line package (DIP) structure as commonly used in the semiconductor industry, comprises a first layer of predetermined material, having at least one internal passage for transmitting a fluid under pressure from a first surface of the first layer to a second surface of the first layer. A pressure sensitive element is bonded to the first surface of the first layer, and covers an exit from the first surface of the internal passage. A lead package, has a plurality of pins, each pin being perpendicular to the first surface of the first layer and placed along a first and second length of the first layer exterior to the pressure sensor package, and having a spacing conforming to the DIP configuration. Predetermined points of the pressure sensitive element are electrically connected to predetermined pins. A second layer of predetermined material is bonded to the first surface of the first layer providing an enclosed spaced for the pressure sensitive element.

10 Claims, 5 Drawing Sheets

PRESSURE SENSOR PACKAGE

BACKGROUND OF THE INVENTION

This invention relates to a pressure transmitter, and more particularly, to a fluid pressure transmitter assembly.

Present pressure sensor packages include a pressure sensor element (i.e., a silicon die having piezo resistive properties utilized to detect variations in pressure) mounted on a "PYREX" glass mounting tube which is included in a steel housing having a header, pressure feed-throughs,... and attached to a meter body.

The silicon die (pressure sensor element) has a relatively low thermal coefficient of expansion (TCE), and steel has a relatively high TCE. If the silicon die were mounted directly on the steel housing, temperature changes would induce strains on the silicon die which would result in erroneous pressure readings. Therefore, an intermediate material is used to mount the silicon die. As mentioned above, a commonly used material is "PYREX" glass, the glass having a TCE which more closely matches the TCE of silicon, and a common method of joining the silicon die to the "PYREX" glass is via a thermal-electric bonding technique.

The present invention mounts the silicon die without the use of an intermediate material; it uses a unique variation of a ceramic dual-in-line package, DIP, such as that used for the mounting of integrated circuit chips. The resulting simplicity of the pressure sensor assembly of the present invention yields features which include the ability to be mounted on a printed circuit board, a variety of mounting arrangements, ease and flexibility of mounting, and lower overall cost. Further, because the silicon die is mounted in a ceramic DIP package, the particular ceramic having a TCE approximately equal to that of silicon, the inducement of any false strains in the silicon die with temperature changes is essentially eliminated.

SUMMARY OF THE INVENTION

Thus, there is provided by the present invention, a pressure sensor package utilizing a multi-layer ceramic structure in the form of an integrated circuit package. The pressure sensor package of the present invention, having a dual-in-line package (DIP) structure, comprises a first layer of predetermined material, having at least one internal passage for transmitting a fluid under pressure from a first surface of the first layer to a second surface of the first layer, the second surface forming an exterior surface of the pressure sensor package. A pressure sensitive element is bonded to the first surface of the first layer, and covers an exit from the first surface of the internal passage. A lead package, has a plurality of pins, each pin being perpendicular to the first surface of the first layer and placed along a first and second length of the first layer exterior to the pressure sensor package, and having a spacing conforming to the common industry standards DIP configuration. Predetermined points of the pressure sensitive element are electrically connected to predetermined pins. A second layer of predetermined material (having a top and bottom surface, the top surface of the second layer forming an exterior surface of the pressure sensitive package and the bottom surface having a cavity) has the bottom surface bonded to the first surface of the first layer, the pressure sensitive element extending into the cavity.

Accordingly, it is an object of the present invention to provide a pressure sensor package utilizing a multi-layer ceramic structure.

It is another object of the present invention to provide a pressure sensor package utilizing a multi-layer ceramic structure in the form of an integrated circuit package.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 1, which comprises

DETAILED DESCRIPTION

Figure 1A:
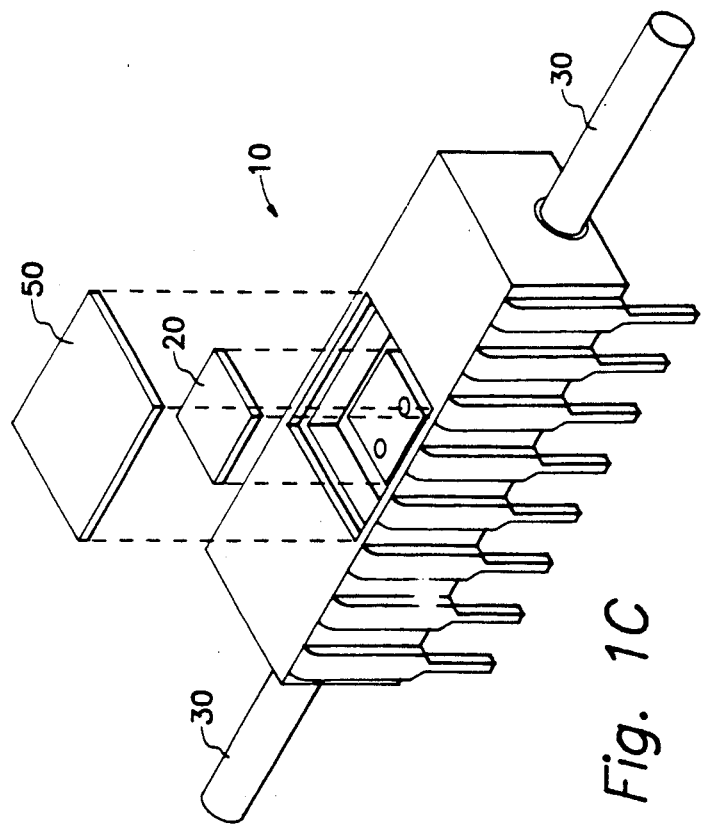
FIGS. 1A through 1C, shows a top view, front view, and a partially exploded isometric view, respectively, of a sensor package of the present invention.
Figure 1B:
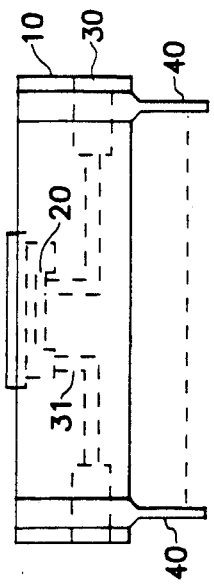
Figure 1C:
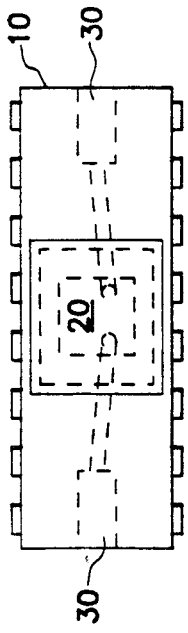
Figure 1D:
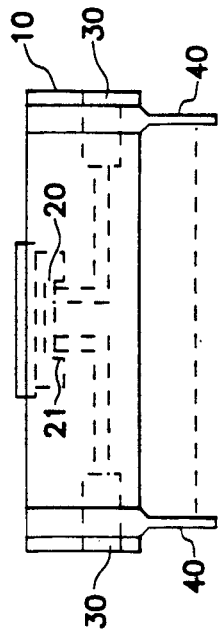
FIG. 1D shows a front view of an alternative embodiment of the sensor package of FIG. 1.

Referring to FIG. 1, which comprises FIGS. 1A through 1C, there is shown a pressure sensor assembly 10 utilizing a standard dual-in-line (DIP) package configuration common in the semiconductor industry for mounting Integrated Circuit (IC) chips. FIGS. 1A and 1B show a top view and a front view, respectively, of the DIP package, and FIG. 1C shows a partially exploded isometric view of the DIP package. A pressure sensor element 20 (i.e., a silicon die which acts as a diaphragm, having a piezo resistive, capacitive, or dielectric properties well known in the art utilized to detect variations in pressure) is mounted in the DIP package 10. In the preferred embodiment of the present invention, the pressure sensing element 20 is mounted on a pedestal 21 of the package 10. The pressure to be measured is input to a pressure port 30, and variations in the electrical properties of the silicon die 20 is measured at the pins 40 of the DIP package in a manner well know to those skilled in the art, the silicon die 20 being electrically connected to predetermined pins 40 of the DIP package 10. A cover 50 is utilized to seal or (cover) the silicon die 20 after it is mounted into the DIP package and connected to the pins 40. The material of the package 10 is ceramic, typically alumina or mullite although other ceramics can be utilized for the package 10. Ceramic materials having a lower temperature coefficient of expansion (TCE) which more closely matches the TCE of the silicon die 20 yields the best performance from the silicon die 20. The attachment techniques of the silicon die 20 to the package can be epoxy, eutectic solder, or ordinary solder in accordance with standard IC practice well known to those skilled in the art. FIG. 1D shows an alternative embodiment (or modification) to the DIP package of FIG. 1B. Specifically, port 31 is positioned such that the pressure is applied to the top side of silicon die 20 while the pressure from port 30 is applied to the under side of silicon die 20, the silicon die 20 thereby measuring a difference in the pressure applied between ports 30 and 31. It will be recognized by those skilled in the art that various configurations and positioning of the ports may be included in the package to yield various configurations and various pressure measurements, as will become more clear hereinunder.

Figure 2:
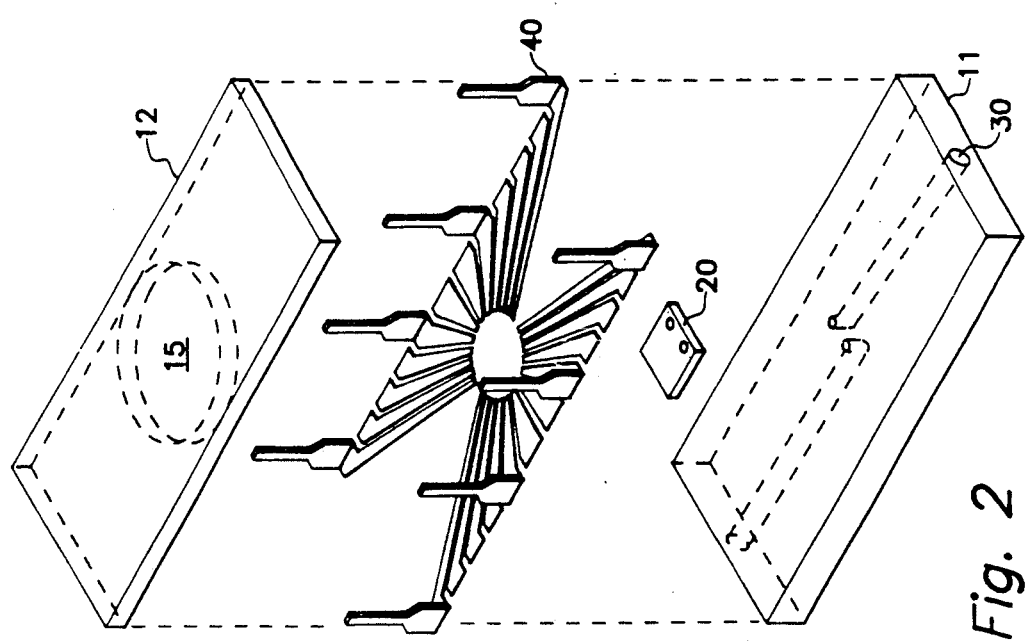
FIG. 2 shows an alternative construction of the package in the form of a multi-layer structure integrated circuit package.

Referring to FIG. 2, there is shown an alternative construction of the package 10 in an exploded isometric view. The alternative construction of the package 10 is formed from a multilayer structure in the form of an integrated circuit package. The silicon die 20 is mounted directly to a center ceramic layer 11. A top level ceramic 12 of the package 10 is joined to the center ceramic layer 11 after die bonding to an electrical lead out frame 40 by using solder glass or an epoxy. The top ceramic layer 12 has a cutout (or cavity) 15 to allow room for the silicon die 20. In the preferred embodiment of the present invention the ceramic layers 11, 12 utilize a ceramic including lead, zirconate, and titanate which matches the thermal-coefficient of expansion of silicon. The TCE of silicon is 3.4, the TCE of the particular ceramic is about 3.6–3.7, and the TCE of steel is approximately 35. The center ceramic layer 11 includes ports (or channels) for conducting the pressure transmission media (i.e., silicone oil) to the silicon die 20 (i.e., the sensor element). The ceramic layers are bonded or cofired together to form a hermetic structure. The package 10 then has access ports which are utilized to couple to a meter body (not shown) or tubes (not shown) which will remotely connect the silicon die to the meter body. The ports 30 (or internal passages) of this configuration are included in the center ceramic layer 11.

Figure 3:
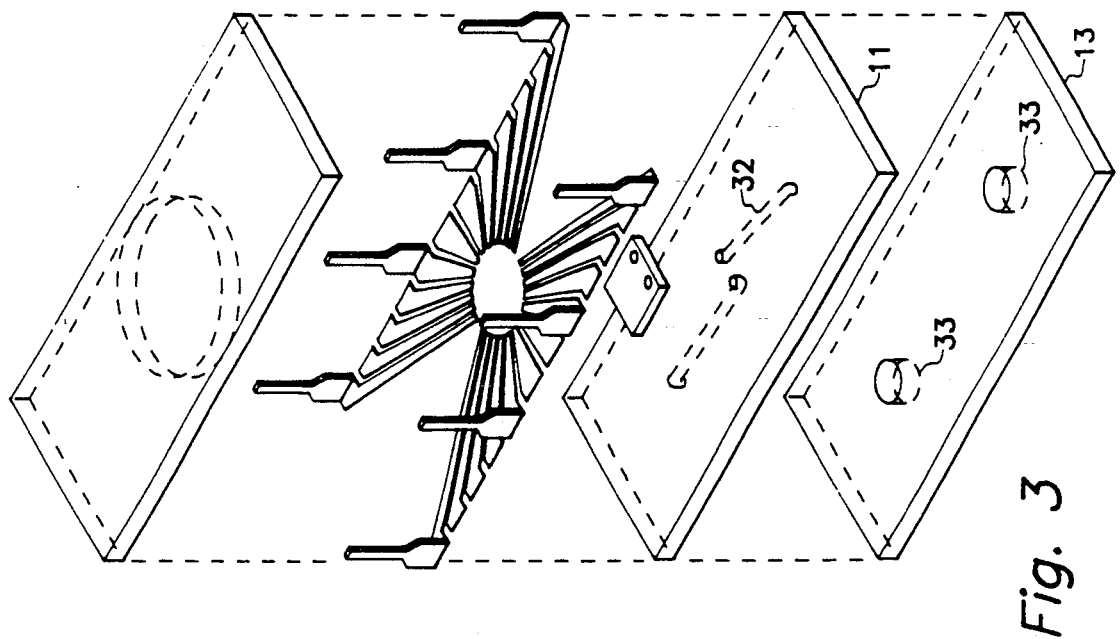
FIG. 3 shows an alternative embodiment to the package of FIG. 2.

Referring to FIG. 3 there is shown an alternative embodiment to the multi-layer structure of FIG. 2. The center ceramic layer 11 includes channels 32 in the underside surface of the center ceramic layer 11. The channels are long enough to extend to vertical ports 33 of a bottom ceramic layer 13. This configuration allows ports to be perpendicular to the package 10 in contrast to the ports of FIG. 2 which extend axially from opposite ends of package 10.

Figure 4A:
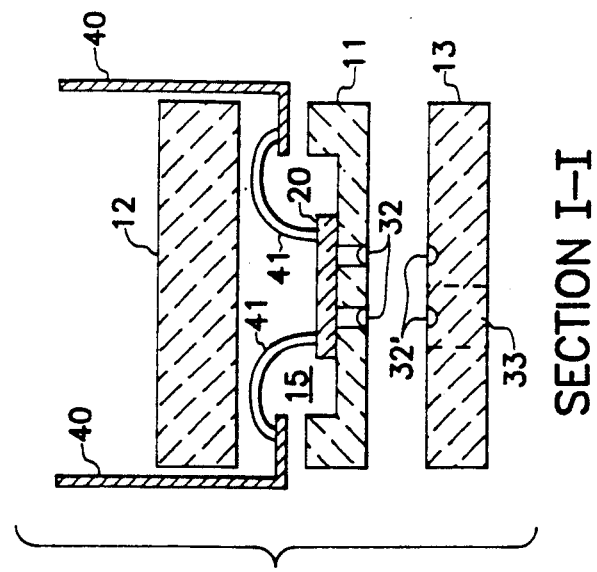
FIG. 4A shows an alternative cross section of the package of FIG. 3.
Figure 4:
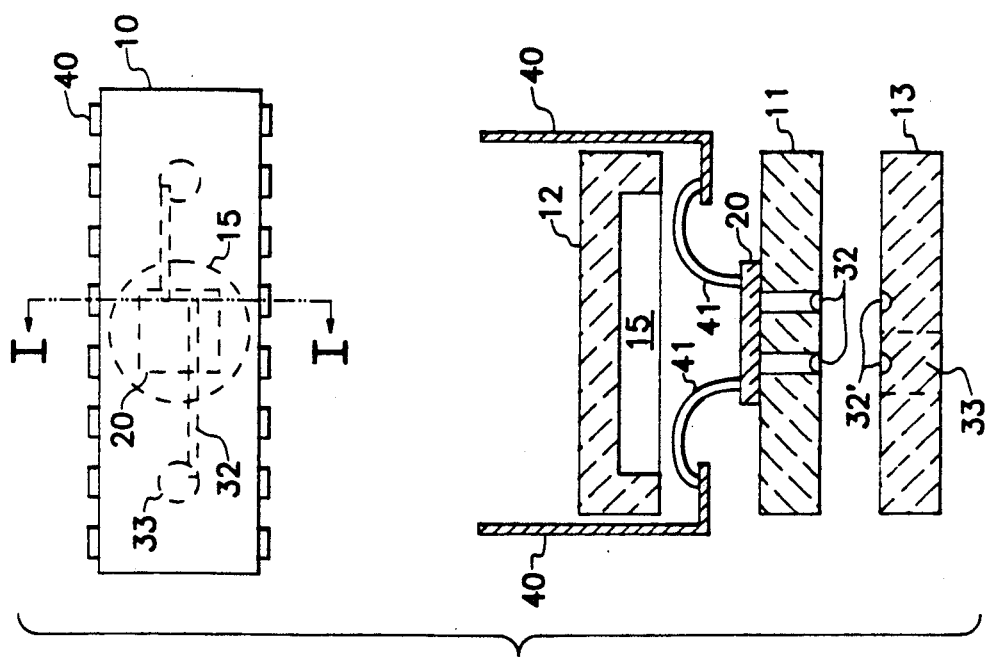
FIG. 4 shows a top view of the package of FIG. 3 along with a cross section of the package.

Referring to FIG. 4 there is shown a top view of the package 10 of FIG. 3, and a cross section, Section I—I of the package 10. In particular, the channels 32 along the underside of the center ceramic 11 are shown with ports leading to the underside of silicon die 20. Also shown are corresponding channels 32' in the top side of bottom ceramic layer 13 which go along the top surface of the bottom ceramic layer 13 from the upward ports to the vertical ports 33. The section is shown as an exploded view in the interest of clarity. As described above in conjunction with FIG. 1D, lower one of the ports 32 may extend upward into the cavity 15 to achieve a differential pressure sensing capability. In conjunction with the above description it will be understood by those skilled in the art that various porting configurations may be achieved to yield various configurations and various functions. Further, it will be recognized by those skilled in the art that the channels 32 and/or 32' may be implemented by adding an addition layer (not shown) between center ceramic layer 11 and bottom ceramic layer 13, the additional layer (not shown) having a cut-out portion (to form a channel) from vertical port 33 to the vertical port 32' beneath the silicon die 20. The use of the addition layer (not shown) can be used for a pressure assembly package 10 made utilizing co-fired ceramic tapes.

FIG. 4A shows an alternate cross section I—I of the package 10 of FIG. 4. In the alternative package configuration, the cavity 15 in the top ceramic layer is not included; however, the cavity 15 is included in the top surface of the center ceramic layer 11. Also in this configuration, the electrical connections 41 will require to be made at the side of the pins 40. Alternatively once again, a cavity can be included in both the center ceramic layer and the top ceramic layer 12. Those skilled in the art will appreciate that various modifications can be made within the scope of the invention.

Figure 5:
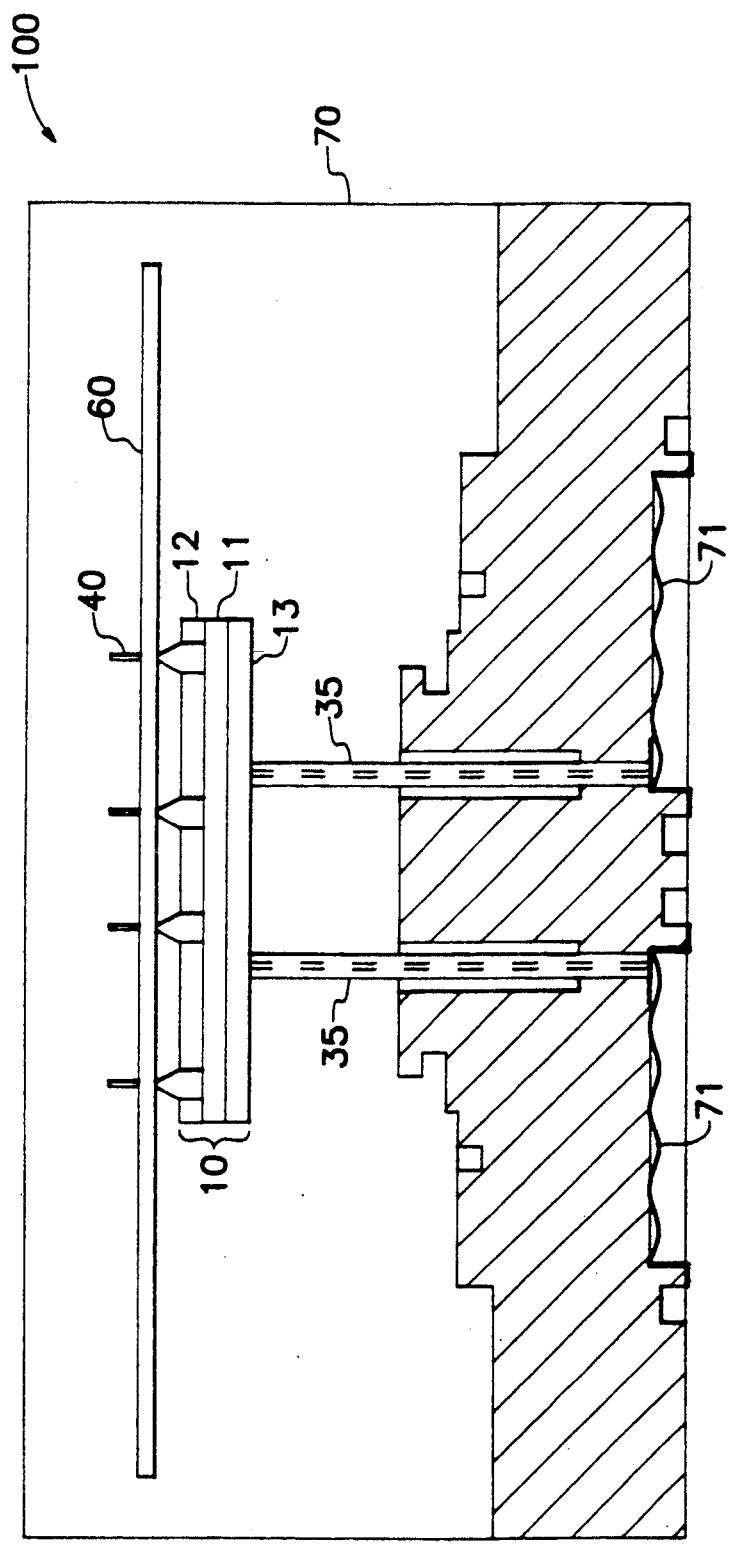
FIG. 5 shows the package mounted in a pressure transmitter assembly.
Figure 6:
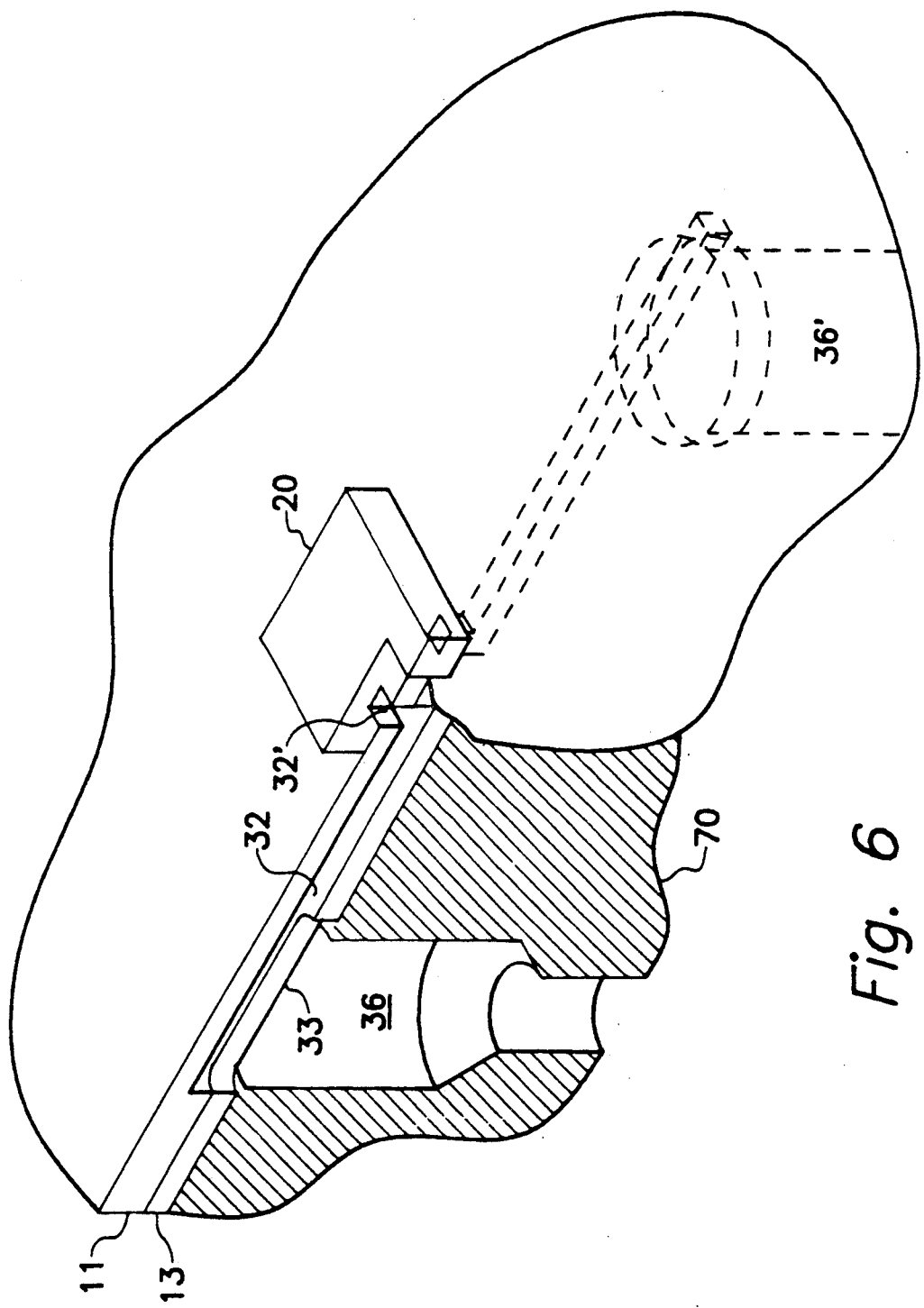
FIG. 6 shows the package mounted directly to a meter body.

FIG. 5 shows the sensor package 10 mounted in a pressure transmitter assembly 100. The pressure transmitter assembly includes the meter body 70 the sensor package 10, having the multilayer ceramic DIP package including the top, center, and bottom ceramic layers 12, 11, 13. The sensor package 10 is mounted to a printed circuit board 60 internal to the meter body, and is coupled to the meter body via capillary tubes 35. The capillary tube serves to remotely connect the sensor package 10 to the meter body, achieving some temperature isolation from the fluid pressure to be measured which can have high temperatures. In the interest of clarity, FIG. 6 shows a cut-away view of the mounting of the sensor package 10 (without the top ceramic layer 12) directly onto a meter body 70. The port 33 of the bottom ceramic layer 13 is made to align with a pressure port 36 the meter body 70. The meter body also includes porting 36' to the opposite side. The silicon die 20 is mounted on the center ceramic layer 11 over the sensor port 32', the upward port from the porting 32 in the center ceramic layer 11.

It will be understood by those skilled in the art that the various bonding of materials is performed using techniques well known to those skilled in the art. It will be understood that the drawings are not necessarily to scale, but are intended to show the features of the device. Further, it will be understood by those skilled in the art that various porting configurations can be used to achieve the various features within the scope of the invention, and that unused ports can be plugged without changing the features achieved by the present invention.

While there has been shown what is considered the preferred embodiment of the present invention, it will be manifest that many changes and modifications can be made therein without departing from the essential spirit and scope of the invention. It is intended, therefore, the annexed claims to cover all such changes and modifications which fall within the true scope of the invention.

We claim:

1. An apparatus for sensing pressure having a dual-in-line package (DIP) structure, comprising;
   a) a first layer of predetermined material, having at least one internal passage for holding a fluid under pressure from a first surface of said first layer to a second surface of said first layer, said second surface forming an exterior surface of said apparatus;
   b) means for sensing pressure, bonded to the first surface of said first layer, and covering an exit from the first surface of the internal passage;
   c) lead package means, having a plurality of pins, each pin being perpendicular to the first surface of the first layer and placed along a first and second length of the first layer exterior to said apparatus, and having a spacing conforming to the DIP configuration, and wherein predetermined points of said means for sensing pressure are electrically connected to predetermined pins; and d) a second layer of predetermined material having a top and bottom surface, the top surface of said second layer forming an exterior surface of said apparatus, the bottom surface having a cavity, the bottom surface of said second layer being bonded to the first surface of said first layer, said means for sensing pressure extending into said cavity.

2. An apparatus for sensing pressure according to claim 1, wherein said means for sensing pressure has piezo resistive or capacitive properties.

3. An apparatus for sensing pressure according to claim 1, wherein said predetermined material of said first layer and said second layer comprise a ceramic material having a temperature coefficient of expansion (TCE) which closely matches the TCE of the means for sensing pressure.

4. An apparatus for sensing pressure according to claim 2, wherein said predetermined material of said first layer and said second layer comprise a ceramic material having a temperature coefficient of expansion (TCE) which closely matches the TCE of the means for sensing pressure.

5. An apparatus for sensing pressure according to claim 1 wherein at least one internal passage of the first layer exits into said cavity, thereby providing a differential pressure to be sensed by said means for sensing pressure.

6. An apparatus for sensing pressure having a dual-in-line package (DIP), comprising a) a first layer of predetermined material, having at least one channel passage along a first surface of the first layer and having a corresponding port from a second surface of the first layer to a corresponding channel;

b) means for sensing pressure, bonded to the second surface of the first layer, and covering the port on the second surface of said first layer;

c) lead package means, having a plurality of pins, each pin being perpendicular to the second surface of the first layer and placed along a first and second length of the first layer exterior to said apparatus, and having a spacing conforming to the DIP configuration, and wherein predetermined points of said means for sensing pressure are electrically connected to predetermined pins;

d) a second layer of predetermined material having a top and bottom surface, the top surface of said second layer forming an exterior surface of said apparatus, the bottom surface having a cavity, the bottom surface of said second layer being bonded to the second surface of said first layer, said means for sensing pressure extending into said cavity; and e) a third layer of a predetermined material having a first and second surface, the first surface of said third layer bonded to the first surface of said first layer, the second surface of said third layer forming an exterior surface of said apparatus, the third layer also having at least one port which extends from the second surface to the first surface, the exit of the port on the first surface being aligned with a corresponding channel of said first layer.

7. An apparatus for sensing pressure according to claim 6, wherein said means for sensing pressure has piezo resistive or capacitive properties.

8. An apparatus for sensing pressure according to claim 6, wherein said predetermined material of said first layer, said second layer and said third layer comprise a ceramic material having a temperature coefficient of expansion (TCE) which closely matches the TCE of the means for sensing pressure.

9. An apparatus for sensing pressure according to claim 7, wherein said predetermined material of said first layer, said second layer and said third layer comprise a ceramic material having a temperature coefficient of expansion (TCE) which matches the TCE of the means for sensing pressure.

10. An apparatus for sensing pressure according to claim 6, wherein one of said ports extends from a channel and exits into said cavity, thereby providing a differential pressure to be sensed by said means for sensing pressure.

* * * * *